(12) United States Patent
Yazawa

(10) Patent No.: US 11,527,361 B2
(45) Date of Patent: Dec. 13, 2022

(54) ELECTRONIC COMPONENT WITH EXPANSION MEMBER FOR PREVENTING OVERCURRENT

(71) Applicant: TDK CORPORATION, Tokyo (JP)

(72) Inventor: Kosuke Yazawa, Tokyo (JP)

(73) Assignee: TDK CORPORATION, Tokyo (JP)

( * ) Notice: Subject to any disclaimer, the term of this patent is extended or adjusted under 35 U.S.C. 154(b) by 3 days.

(21) Appl. No.: 17/130,552

(22) Filed: Dec. 22, 2020

(65) Prior Publication Data
US 2021/0202170 A1 Jul. 1, 2021

(30) Foreign Application Priority Data

Dec. 27, 2019 (JP) .............................. JP2019-238487

(51) Int. Cl.
*H01G 4/228* (2006.01)
*H01G 2/14* (2006.01)
*H01G 2/18* (2006.01)

(52) U.S. Cl.
CPC ............... *H01G 4/228* (2013.01); *H01G 2/14* (2013.01); *H01G 2/18* (2013.01)

(58) Field of Classification Search
CPC ............ H01G 4/30; H01G 4/228; H01G 2/14; H01G 2/16; H01G 2/18
See application file for complete search history.

(56) References Cited

U.S. PATENT DOCUMENTS

| | | | | |
|---|---|---|---|---|
| 2011/0043321 A1* | 2/2011 | Takeda | ............... | H01H 37/5418 337/362 |
| 2015/0055274 A1* | 2/2015 | Kimura | ................. | B23K 20/16 228/179.1 |
| 2020/0118752 A1* | 4/2020 | Cho | ..................... | H01G 4/2325 |
| 2021/0193384 A1* | 6/2021 | Kim | ....................... | H01G 4/232 |

FOREIGN PATENT DOCUMENTS

| JP | S58-147234 U |   | 10/1983 |
|---|---|---|---|
| JP | 2000124062 A | * | 4/2000 |
| JP | 2002164246 A | * | 6/2002 |
| JP | 2002198254 A | * | 7/2002 |
| JP | 2011071220 A | * | 4/2011 |
| KR | 20140107473 A | * | 9/2014 |

OTHER PUBLICATIONS

Reiss, Howard, Method of Thermodynamics, Chapter 5.2, 1965, Dover Publications, p. 83 (Year: 1965).*

* cited by examiner

*Primary Examiner* — David M Sinclair
*Assistant Examiner* — Daniel M Dubuisson
(74) *Attorney, Agent, or Firm* — Oliff PLC

(57) ABSTRACT

An electronic component device includes an electronic component, a pair of metal terminals, a bonding member, and an expansion member having thermal expansibility. The electronic component includes an element body and a pair of external electrodes. The element body has a pair of end faces opposed to each other. The pair of external electrodes is disposed on the pair of end faces. The pair of metal terminals is electrically connected to the pair of external electrodes.

(Continued)

The bonding member bonds one of the pair of external electrodes to one of the pair of metal terminals. The bonding member electrically connects the one of the pair of external electrodes to the one of the pair of metal terminals. The one of the pair of metal terminals includes an opposing face. The opposing face is a flat face.

15 Claims, 5 Drawing Sheets

ELECTRONIC COMPONENT WITH EXPANSION MEMBER FOR PREVENTING OVERCURRENT

TECHNICAL FIELD

The present disclosure relates to an electronic component device.

BACKGROUND

Japanese Unexamined Utility Model Publication No. S58-147234 discloses an electronic component equipped with a thermal fuse. In this electronic component, the thermal fuse is disposed between a terminal and an element. The thermal fuse is expanded and broken due to heat generation, and it is possible to prevent overcurrent.

SUMMARY

Technical Problem

One aspect of the present disclosure provides an electronic component device capable of further preventing overcurrent.

Solution to Problem

An electronic component device according to one aspect of the present disclosure includes an electronic component, a pair of metal terminals, a bonding member, and an expansion member having thermal expansibility. The electronic component includes an element body and a pair of external electrodes. The element body has a pair of end faces opposed to each other. The pair of external electrodes is disposed on the pair of end faces. The pair of metal terminals is electrically connected to the pair of external electrodes. The bonding member bonds one of the pair of external electrodes to one of the pair of metal terminals. The bonding member electrically connects the one of the pair of external electrodes to the one of the pair of metal terminals. The one of the pair of metal terminals includes an opposing face. The opposing face is opposed to one of the pair of end faces in the opposing direction of the pair of end faces. The opposing face is bonded to the one of the pair of external electrodes by the bonding member. The expansion member is disposed between the opposing face and the one of the pair of external electrodes. The opposing face is a flat face.

In this electronic component device, the one of the pair of metal terminals include the opposing face opposed to the one of the pair of end faces of the element body of the electronic component and bonded to the one of the pair of external electrodes by the bonding member. The expansion member having thermal expansibility is disposed between the opposing face and the one of the pair of external electrodes. When the electronic component is heated, the expansion member thermally expands. Accordingly, the opposing face receives the force from the expansion member in the direction away from the one of the pair of external electrodes. Thus, the bonding between the opposing face and the one of the pair of external electrodes by the bonding member is broken, and it is possible to prevent overcurrent.

If the opposing face is bent or curved, the bent portion or the curved portion easily receives force locally, and the bent portion or the curved portion alone can be deformed. As a result, the opposing face cannot be separated from the external electrode, and the bonding between the opposing face and the external electrode by the bonding member cannot be reliably broke. In contrast, since the opposing face is a flat face in this electronic component device, the entire opposing face easily receives the force from the expansion member. Thus, it is possible to separate the opposing face from the external electrode and to reliably break the bonding between the opposing face and the external electrode by the bonding member. Consequently, it is possible to further prevent overcurrent.

When viewed from the opposing direction, the expansion member may be disposed around the bonding member. In this case, the expansion member expands, and the bonding by the bonding member is easily broken. Accordingly, it is possible to much further prevent overcurrent.

When viewed from the opposing direction, the expansion member may be disposed line-symmetrically with respect to a straight line passing through a center of the bonding member. In this case, the bonding by the bonding member is easily broken in a well-balanced manner.

When viewed from the opposing direction, the expansion members may be disposed point-symmetrically with respect to the center of the bonding member. In this case, the bonding by the bonding member is easily broken in a well-balanced manner.

When viewed from the opposing direction, the expansion member may have an annular shape and surround the bonding member. In this case, the expansion member expands, and the bonding by the bonding member is more easily broken.

When viewed from the opposing direction, the bonding member may be disposed around the expansion member. In this case, the expansion member expands, and the bonding by the bonding member is easily broken. Accordingly, it is possible to much further prevent overcurrent.

When viewed from the opposing direction, the bonding member may be disposed line-symmetrically with respect to a straight line passing through a center of the expansion member. In this case, the bonding by the bonding member is easily broken in a well-balanced manner.

When viewed from the opposing direction, the bonding member may be disposed point-symmetrically with respect to the center of the expansion member. In this case, the bonding by the bonding member is easily broken in a well-balanced manner.

When viewed from the opposing direction, the bonding member may have an annular shape and surround the expansion member. In this case, the expansion member expands, and the bonding by the bonding member is more easily broken.

The expansion member may irreversibly thermally expand and have electrical insulation at least in a thermally expanding state. In this case, it is possible to prevent the opposing face and the one of the pair of external electrodes from being electrically connected to each other through the thermally expanding expansion member.

DETAILED DESCRIPTION

Hereinafter, embodiments will be described in detail with reference to the accompanying drawings. In the description of the drawings, identical or equivalent elements are denoted by the same reference signs, and overlapped descriptions are omitted.

First Embodiment

Figure 1:
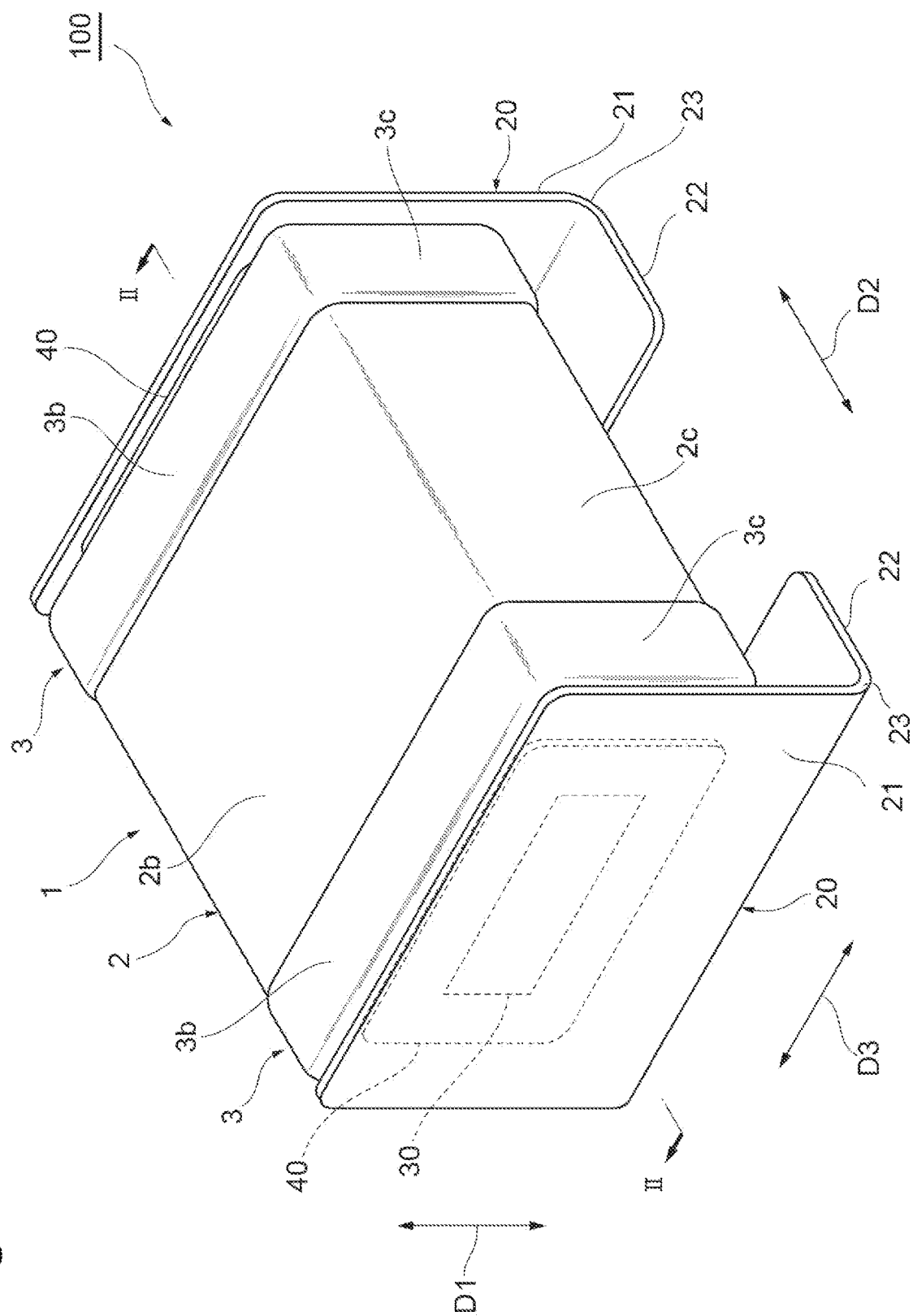
FIG. 1 is a perspective view of an electronic component device according to a first embodiment.
Figure 2:
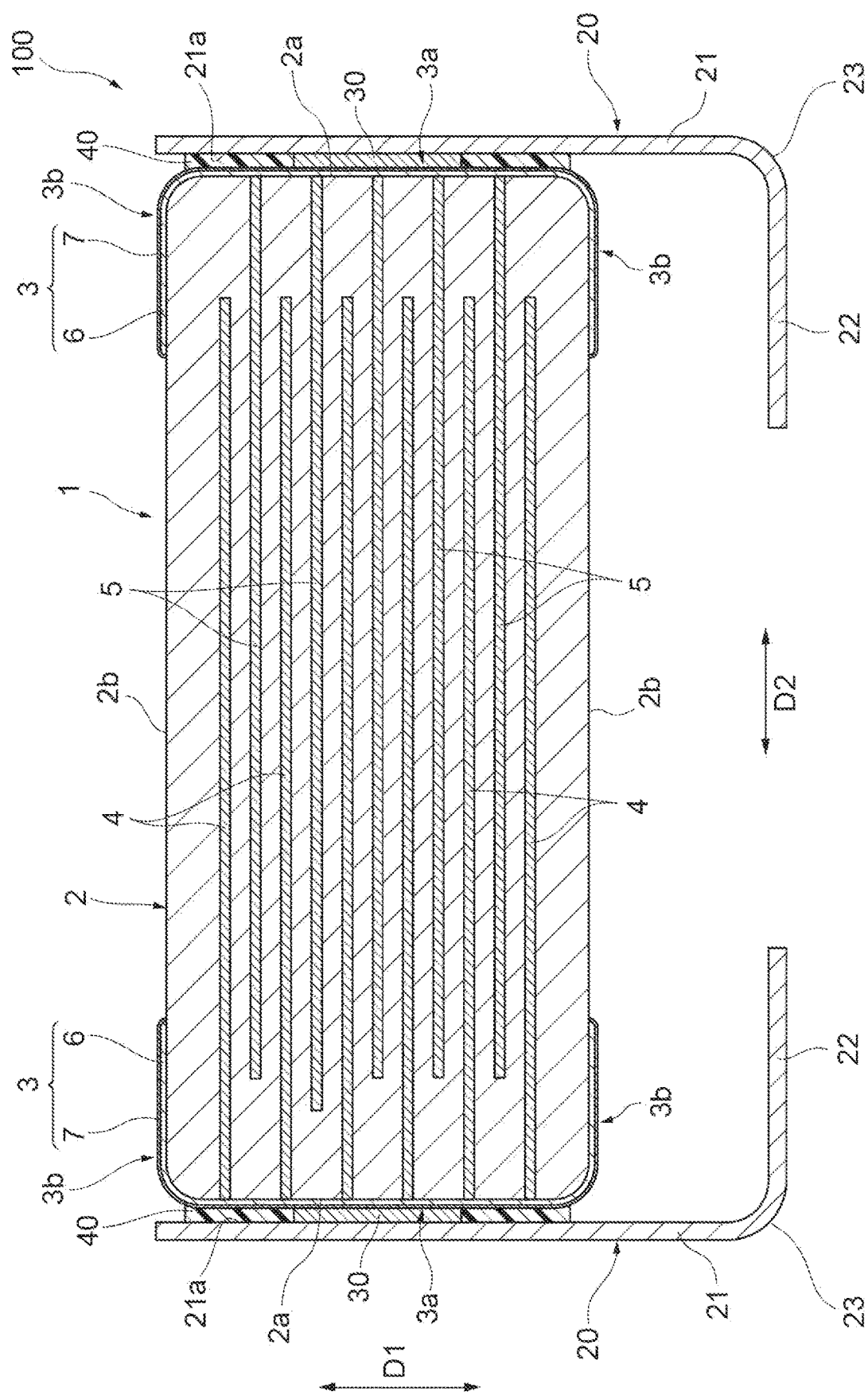
FIG. 2 is a diagram showing a cross-sectional structure of the electronic component device in FIG. 1.

FIG. 1 is a perspective view of an electronic component device according to a first embodiment. FIG. 2 is a diagram showing a cross-sectional structure of the electronic component device in FIG. 1. As shown in FIGS. 1 and 2, an electronic component device 100 according to the first embodiment includes an electronic component 1, a pair of metal terminals 20, a pair of bonding members 30, and a pair of expansion members 40.

The electronic component 1 is, for example, a multilayer condenser. The electronic component 1 includes an element body 2, a pair of external electrodes 3 disposed on the outer surfaces of the element body 2, and internal electrodes 4 and 5 disposed inside the element body 2.

The element body 2 has a rectangular parallelepiped shape. The rectangular parallelepiped shape includes a rectangular parallelepiped shape in which the corner portions and the ridge portions are chamfered, and a rectangular parallelepiped shape in which the corner portions and the ridge portions are rounded. The element body 2 has, as its outer surfaces, a pair of end faces 2a opposed to each other, a pair of main faces 2b opposed to each other, and a pair of side faces 2c opposed to each other. The opposing direction in which the main faces 2b are opposed to each other is a first direction D1. The opposing direction in which the end faces 2a are opposed to each other is a second direction D2. The opposing direction in which the side faces 2c are opposed to each other is a third direction D3. In the present embodiment, the first direction D1 is the height direction of the element body 2. The second direction D2 is the longitudinal direction of the element body 2 and is orthogonal to the first direction D1. The third direction D3 is the width direction of the element body 2 and is orthogonal to the first direction D1 and the second direction D2.

Each end face 2a extends in the first direction D1 in such a way as to connect the main faces 2b. Each end face 2a also extends in the third direction D3. Each side face 2c extends in the first direction D1 in such a way as to connect the main faces 2b. Each side face 2c also extends in the second direction D2. In the present embodiment, one main face 2b is defined as an opposing face opposed to another electronic device (for example, a circuit board, an electronic component, or the like) when the electronic component device 100 is mounted on the other electronic device.

The length of the element body 2 in the first direction D1 (the height) is, for example, 0.05 mm or more and 5.00 mm or less. The length of the element body 2 in the second direction D2 (the length) is, for example, 0.10 mm or more and 12.00 mm or less. The length of the element body 2 in the third direction D3 (the width) is, for example, 0.05 mm or more and 10.00 mm or less.

The element body 2 is formed by laminating a plurality of dielectric layers (insulator layers) in the opposing direction in which the main faces 2b are opposed to each other. In the element body 2, the laminating direction of the dielectric layers (hereinafter, simply referred to as a "laminating direction") aligns with the first direction D1. Each dielectric layer is formed by a sintered body of a ceramic green sheet containing, for example, a dielectric material ($BaTiO_3$-based, $Ba(Ti, Zr)O_3$-based, or $(Ba, Ca)TiO_3$-based dielectric ceramic). In the actual element body 2, the insulator layers are integrated in such a way that boundaries between the layers cannot be visually recognized The external electrodes 3 are separated from each other in the second direction D2. The external electrodes 3 are disposed on the respective end faces 2a of the element body 2, that is, on both ends of the element body 2 in the second direction D2. Each external electrode 3 includes an electrode portion 3a disposed on the end face 2a, a pair of electrode portions 3b disposed on the pair of main faces 2b, and a pair of electrode portions 3c disposed on the pair of side face 2c. That is, each external electrode 3 is formed on five faces of one end face 2a, the main faces 2b, and the side faces 2c. The electrode portions adjacent to each other are connected at the ridge portion of the element body 2 and are electrically connected.

The electrode portion 3a is disposed in such a way as to cover all the portions of the corresponding internal electrode 4 or 5 exposed from the end face 2a, and the internal electrodes 4 and 5 are directly connected to the electrode portions disposed on the end face 2a. Accordingly, the internal electrodes 4 and 5 are electrically connected to the corresponding external electrodes 3.

Each external electrode 3 includes a first electrode layer 6 provided on the element body 2 and a second electrode layer 7 provided on the first electrode layer 6. That is, the electrode portions 3a, 3b, and 3c of the external electrode 3 each include the first electrode layer 6 and the second electrode layer 7. The second electrode layer 7 constitutes the outermost layer of the external electrode 3.

The first electrode layer 6 is formed by applying a conductive paste on the surface of the element body 2 and baking it. The first electrode layer 6 is a sintered metal layer formed by sintering a metal component (metal powder) contained in the conductive paste. That is, the first electrode layer 6 is a sintered metal layer formed on the element body 2. In the present embodiment, the first electrode layer 6 is a sintered metal layer made of Cu. The first electrode layer 6 may be a sintered metal layer made of Ni. As described above, the first electrode layer 6 contains Cu or Ni. As the conductive paste, a powder made of Cu or Ni mixed with a glass component, an organic binder, and an organic solvent is used.

The second electrode layer 7 is formed on the first electrode layer 6 by plating. The second electrode layer 7 includes, for example, a Ni plating layer formed on the first electrode layer 6 and an Sn plating layer formed on the Ni plating layer.

The internal electrodes 4 and 5 are made of a conductive material usually used as an internal electrode of a multilayer electric element. As the conductive material, a base metal (for example, Ni or Cu) is used. The internal electrodes 4 and 5 each are formed as a sintered body of a conductive paste containing the conductive material. In the present embodiment, the internal electrodes 4 and 5 are made of Ni.

The internal electrodes 4 and 5 are disposed at different positions (layers) from each other in the first direction D1. That is, the internal electrodes 4 and 5 are alternately disposed in the element body 2 in such a way as to be opposed to each other with an interval in the first direction D1. The internal electrodes 4 and 5 have different polarities from each other. The internal electrode 4 has an end connected to one external electrode 3. The internal electrode 5 has an end connected to the other external electrode 3.

The pair of metal terminals 20 is disposed in such a way as to oppose the pair of end faces 2a of the electronic component 1. The metal terminals 20 are separated from each other in the second direction D2. The metal terminals 20 are electrically connected to the corresponding external electrodes 3. The metal terminals 20 are electrically connected to the corresponding internal electrodes 4 and 5 via the corresponding external electrodes 3. One metal terminal 20 is electrically connected to the internal electrode 4 via one external electrode 3. The other metal terminal 20 is electrically connected to the internal electrode 5 via the other external electrode 3.

Each metal terminal 20 has an L-shape. Each metal terminal 20 includes a connecting portion 21, a leg portion 22, and a coupling portion 23 coupling the connecting portion 21 and the leg portion 22. The connecting portion 21, the leg portion 22, and the coupling portion 23 are integrally formed to constitute one member.

The connecting portion 21 extends from the coupling portion 23 in the first direction D1. The connecting portion 21 has a rectangular shape when viewed from the second direction D2. The connecting portion 21 is bonded to the electrode portion 3a of the external electrode 3 by the bonding member 30. The connecting portion 21 has an opposing face 21a opposed to the end face 2a in the opposing direction of the pair of end faces 2a (hereinafter, simply referred to as an "opposing direction"). The opposing face 21a is a flat face and has no bent portion or curved portion. The opposing face 21a overlaps the external electrode 3 when viewed from the opposing direction.

The leg portion 22 extends from the coupling portion 23 in the second direction D2. The leg portion 22 has a rectangular shape when viewed from the first direction D1. The connecting portion 21 and the leg portion 22 extend in directions intersecting each other (in the present embodiment, directions orthogonal to each other). The leg portion 22 is opposed to one main face 2b in the first direction D1. The leg portion 22 is connected to another electronic device (for example, a circuit board, an electronic component, or the like). The leg portion 22 is a flat plate.

The coupling portion 23 couples one end (lower end) of the connecting portion 21 in the first direction D1 and one end of the leg portion 22 in the second direction D2. In the present embodiment, the coupling portion 23 is a bent portion. The metal terminal 20 is formed by, for example, bending a plate member.

Each bonding member 30 is disposed between the electrode portion 3a of the external electrode 3 and the opposing face 21a of the metal terminal 20 and bonds the external electrode 3 to the metal terminal 20. Each bonding member 30 has conductivity and electrically connects the external electrode 3 to the metal terminal. Each bonding member 30 is, for example, solder or a conductive adhesive (conductive resin layer). The conductive adhesive is composed of, for example, resin, such as thermosetting resin, and a conductive filler, such as Ag. As the thermosetting resin, phenol resin, acrylic resin, silicone resin, epoxy resin, polyimide resin, or the like is used, for example.

Each expansion member 40 is disposed together with the bonding member 30 between the electrode portion 3a of the external electrode 3 and the opposing face 21a of the metal terminal 20. Each expansion member 40 is made of a thermal expansion material that irreversibly thermally expands. The volume of each expansion member 40 expands, at a predetermined temperature or higher, 1.2 times or more, more preferably 10 times or more.

The thermal expansion material constituting each expansion member 40 includes, for example, a resin composition containing epoxy resin or butyl rubber as a resin component. The temperature at which each expansion member 40 expands is set higher than, for example, the melting point of solder or the curing temperature of the thermosetting resin that can be contained in each bonding member 30. Thus, it is possible that the metal terminal 20 is bonded to the external electrode 3 by each bonding member 30 or that the electronic component device 100 is mounted on another electronic device by soldering or the like without expanding each expansion member 40.

Each expansion member 40 has thermal expansibility. As an example, each expansion member 40 has electrical insulation at least in a thermally expanding state. That is, each expansion member 40 may have electrical insulation before expansion or may have conductivity before expansion. In this case, it is possible to prevent the opposing face 21a of the metal terminal 20 from being electrically connected to the external electrode 3 through each expansion member 40 in the thermally expanding state. Alternatively, each expansion member 40 may be configured to have electrical insulation as a whole in the thermally expanding state. Each expansion member 40 may have conductivity before expansion by containing, for example, conductive fillers and may further have electrical insulation by separating the conductive fillers from each other in a thermally expanding state. Each expansion member 40 may have, for example, a multilayer structure to include an insulating layer having electrical insulation and a thermal expansion layer that irreversibly thermally expands. Here, the electrical insulation is only required to be any substantial electrical insulation, and the electrical conductivity may be, for example, $1.0 \times 10^{-5}$ Ω·cm or less.

As another example, each expansion member 40 also has electrical conductivity in a thermally expanding state. In this case, each expansion member 40 expands, thereby completely separating the opposing face 21a of the metal terminal 20 from the expansion member 40 and the bonding member 30. For example, each opposing face 21a can be completely separated from the expansion member 40 and the bonding member 30 by dropping the electronic component 1 together with the pair of expansion members 40 from the pair of opposing faces 21a when the bonding by the bonding members 30 is broken.

The thickness of each expansion member 40 (the length in the second direction D2) is the same as, for example, the thickness of each bonding member 30 (the length in the second direction D2). Thus, each expansion member 40 is in contact with, for example, the electrode portion 3a and the opposing face 21a. Note that, each expansion member 40 is only required to be thicker than each bonding member 30 after expansion and may be thinner than each bonding member 30 before expansion.

Each expansion member 40 is, for example, applied on the opposing face 21a or the electrode portion 3a before the metal terminal 20 is bonded to the external electrode 3 by the bonding member 30. Each expansion member 40 is, for example, applied on the opposing face 21a or the electrode portion 3a by a dispenser in a liquid state. Each expansion member 40 is hardened to a solid state after being applied.

Each expansion member 40 may be applied on the opposing face 21a or the electrode portion 3a in, for example, a solid sheet state.

Each expansion member 40 may be applied between the opposing face 21a and the electrode portion 3a after the metal terminal 20 is bonded to the external electrode 3 by the bonding member 30. In this case, each expansion member 40 may be injected into the gap between the opposing face 21a and the electrode portion 3a by a dispenser in a liquid state or may be inserted into the gap in a solid sheet state.

Figure 3:
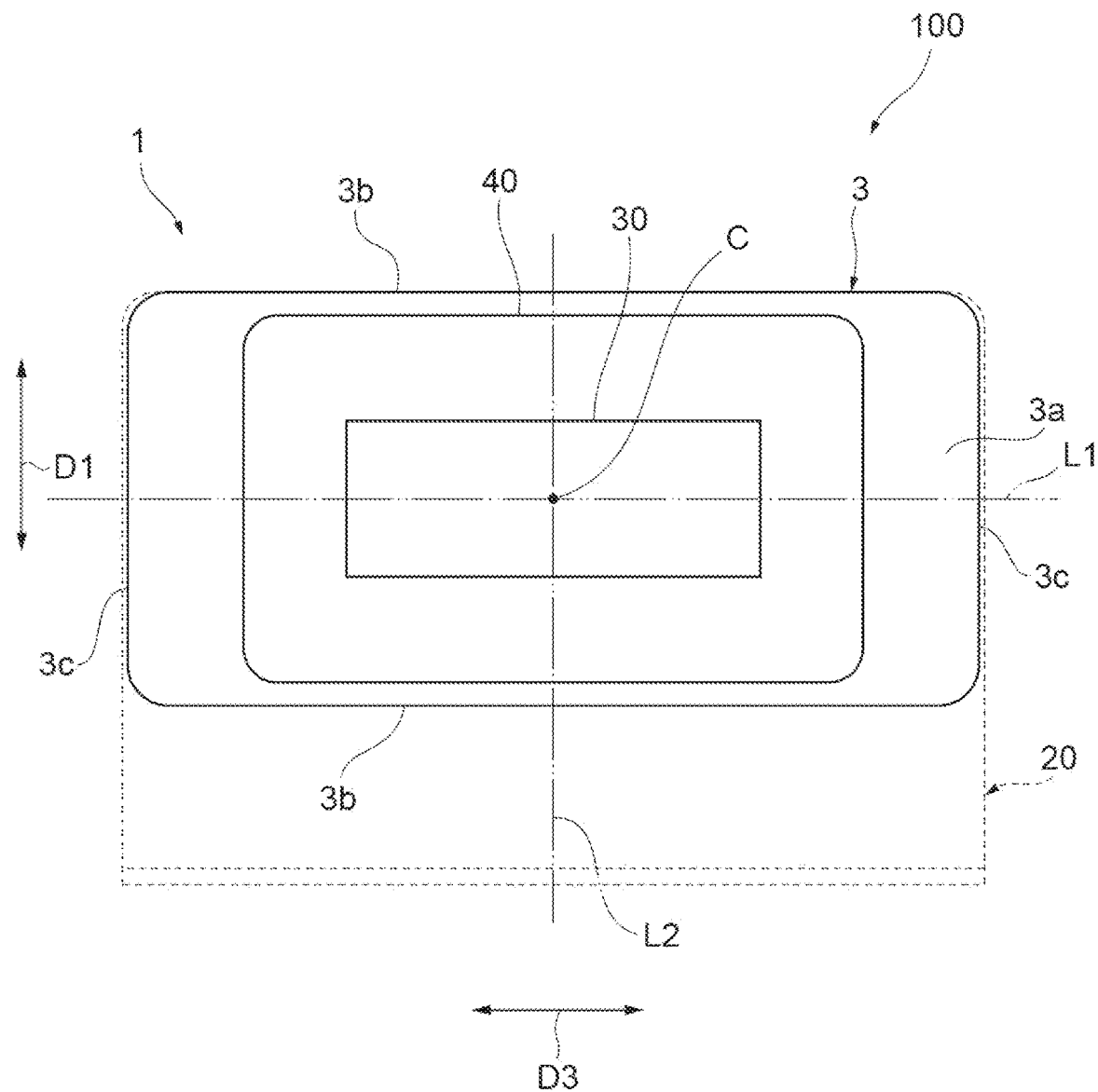
FIG. 3 is a side view of the electronic component device in FIG. 1.

FIG. 3 is a side view of the electronic component device in FIG. 1. FIG. 3 is a side view of the electronic component device 100 when viewed from one metal terminal 20 side. In FIG. 3, the metal terminal 20 is shown by a broken line. As shown in FIG. 3, when viewed from the metal terminal 20 side (viewed from the opposing direction), the bonding member 30 is disposed at the center portion of the electrode portion 3a. The expansion member 40 is disposed around the bonding member 30. When viewed from the opposing direction, the expansion member 40 has an annular shape (frame shape) and surrounds the bonding member 30. The inner edge of the expansion member 40 is in contact with the outer edge of the bonding member 30. In the present embodiment, the bonding member 30 has a rectangular shape and the expansion member 40 has a rectangular annular shape (rectangular frame shape) when viewed from the opposing direction.

When viewed from the opposing direction, the expansion member 40 is disposed line-symmetrically with respect to both straight lines L1 and L2 passing through the center C of the bonding member 30. The center C is, for example, the intersection of the center line of the bonding member 30 in the first direction D1 and the center line of the bonding member 30 in the third direction D3 when viewed from the opposing direction. Here, the center line of the bonding member 30 in the first direction D1 is a virtual straight line parallel to the third direction D3 and has a distance equal to the distance between both ends of the bonding member 30 in the first direction D1 (the distance in the first direction D1). The center line of the bonding member 30 in the third direction D3 is a virtual straight line parallel to the first direction D1 and has a distance equal to the distance between both ends of the bonding member 30 in the third direction D3 (the distance in the third direction D3). The center C may be, for example, the center of gravity of the shape formed by the bonding member 30 when viewed from the opposing direction. The straight line L1 is a virtual straight line parallel to the third direction D3. The straight line L2 is a virtual straight line parallel to the first direction D1.

When viewed from the opposing direction, the area of the expansion member 40 is, for example, 0.1 times or more and 10 times or less the area of the bonding member 30.

The effects of the electronic component device 100 will be described below.

In the electronic component device 100, each metal terminal 20 has the opposing face 21a opposed to the end face 2a of the element body 2 of the electronic component 1 in the opposing direction and bonded to the external electrode 3 by the bonding member 30. The expansion member 40 having thermal expansibility is disposed between the opposing face 21a and the external electrode 3. When the electronic component 1 is heated, the expansion member 40 thermally expands. Accordingly, the opposing face 21a of the metal terminal 20 receives the force from the expansion member 40 in the direction away from the external electrode 3. Thus, the bonding between the opposing face 21a and the external electrode 3 by the bonding member 30 is broken, and it is possible to prevent overcurrent.

If the opposing face 21a is bent or curved, the bent portion or the curved portion (top of the curve) easily receives force locally, and the bent portion or the curved portion alone can be deformed. As a result, the other portions of the opposing face 21a hardly receive force, and the entire opposing face 21a cannot be separated from the external electrode 3. Thus, the bonding between the opposing face 21a and the external electrode 3 by the bonding member 30 cannot be reliably broke. In contrast, since the opposing face 21a is a flat face in the electronic component device 100, the entire opposing face 21a easily receives the force from the expansion member 40. Thus, it is possible to separate the entire opposing face 21a from the external electrode 3 and to reliably break the bonding between the opposing face 21a and the external electrode 3 by the bonding member 30. Consequently, it is possible to further prevent overcurrent.

When viewed from the opposing direction, the expansion member 40 is disposed around the bonding member 30. Thus, the expansion member 40 expands, and the bonding between the metal terminal 20 and the external electrode 3 by the bonding member 30 is easily broken. Accordingly, it is possible to much further prevent overcurrent.

When viewed from the opposing direction, the expansion member 40 is disposed line-symmetrically with respect to both straight lines L1 and L2 passing through the center C of the bonding member 30. In addition, when viewed from the opposing direction, the expansion member 40 is disposed point-symmetrically with respect to the center C of the bonding member 30. Thus, the bonding by the bonding member 30 is easily broken in a well-balanced manner.

When viewed from the opposing direction, the expansion member 40 has an annular shape and surrounds the bonding member 30. Thus, the expansion member 40 expands, and the bonding by the bonding member 30 is more easily broken.

Second Embodiment

Figure 4:
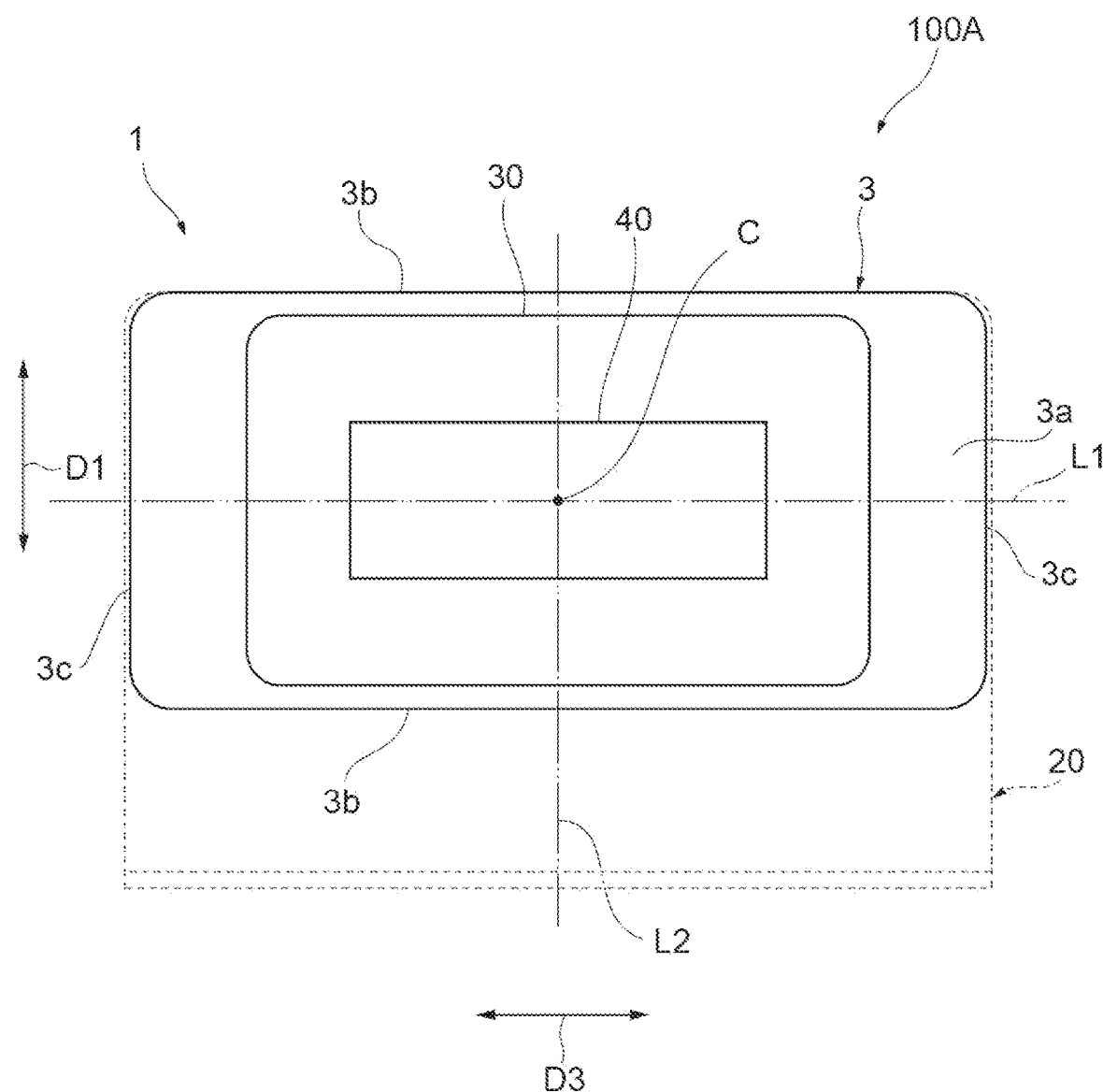
FIG. 4 is a side view of an electronic component device according to a second embodiment.

FIG. 4 is a side view of an electronic component device according to a second embodiment. FIG. 4 is a side view of an electronic component device 100A when viewed from one metal terminal 20 side. In FIG. 4, the metal terminal 20 is shown by a broken line. As shown in FIG. 4, the electronic component device 100A according to the second embodiment is different from the electronic component device 100 according to the first embodiment in that the disposition of a bonding member 30 and an expansion member 40 are interchanged with each other and is the same as the electronic component device 100 according to the first embodiment in other respects.

In the electronic component device 100A, the expansion member 40 is disposed at the center portion of an electrode portion 3a when viewed from the metal terminal 20 side (viewed from the opposing direction). The bonding member 30 is disposed around the expansion member 40 and surrounds the expansion member 40. When viewed from the opposing direction, the bonding member 30 has an annular shape (frame shape). The inner edge of the bonding member 30 is in contact with the outer edge of the expansion member 40. In the present embodiment, the expansion member 40 has a rectangular shape, and the bonding member 30 has a rectangular frame shape (rectangular annular shape) when viewed from the opposing direction.

When viewed from the second direction D2, the bonding member 30 is disposed line-symmetrically with respect to both straight lines L1 and L2 passing through the center C of the expansion member 40. Here, the center C is, for example, the position of the center of gravity of the shape formed by the expansion member 40 when viewed from the second direction D2. The straight line L1 is a virtual straight line parallel to the third direction D3. The straight line L2 is a virtual straight line parallel to the first direction D1.

When viewed from the opposing direction, the area of the bonding member 30 is, for example, 0.1 times or more and 10 times or less the area of the expansion member 40.

In the electronic component device 100A, the opposing face 21a is a flat face similarly to the electronic component device 100 and more easily receives the force from the expansion member 40 as compared with the case of being bent or curved. Accordingly, it is possible to further prevent overcurrent.

When viewed from the opposing direction, the bonding member 30 is disposed around the expansion member 40. Thus, the expansion member 40 expands, and the bonding between the metal terminal 20 and the external electrode 3 by the bonding member 30 is easily broken. Accordingly, it is possible to much further prevent overcurrent.

When viewed from the opposing direction, the bonding member 30 is disposed line-symmetrically with respect to both straight lines L1 and L2 passing through the center C of the expansion member 40. In addition, when viewed from the opposing direction, the bonding member 30 is disposed point-symmetrically with respect to the center C of the expansion member 40. Thus, the bonding by the bonding member 30 is easily broken in a well-balanced manner.

When viewed from the opposing direction, the bonding member 30 has an annular shape and surrounds the expansion member 40. Thus, the expansion member 40 expands, and the bonding by the bonding member 30 is more easily broken.

Third, Fourth, and Fifth Embodiments

Figure 5A:
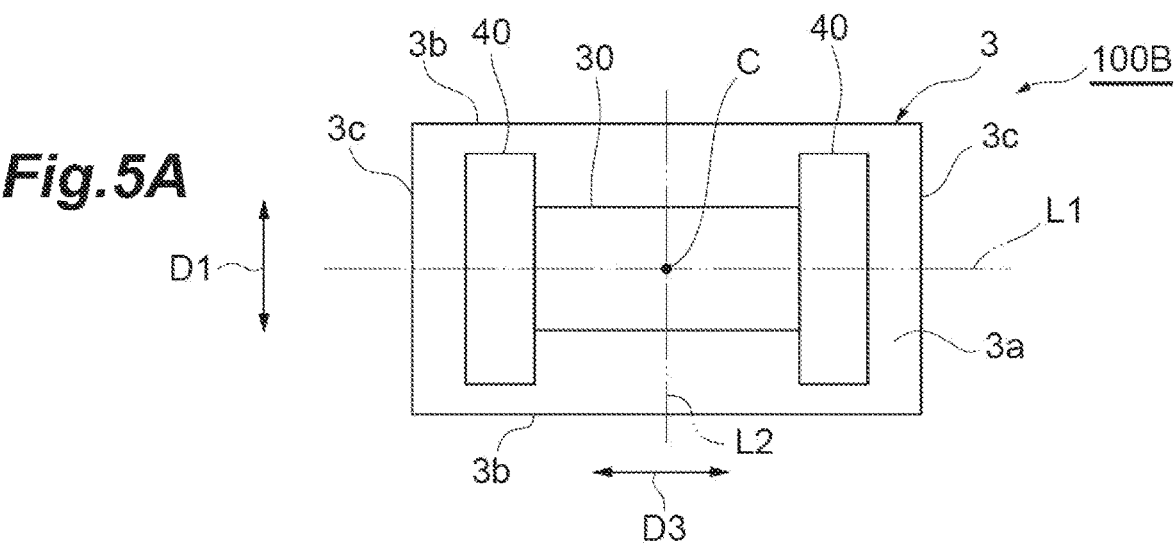
FIG. 5A is a side view of an electronic component device according to a third embodiment.
Figure 5B:
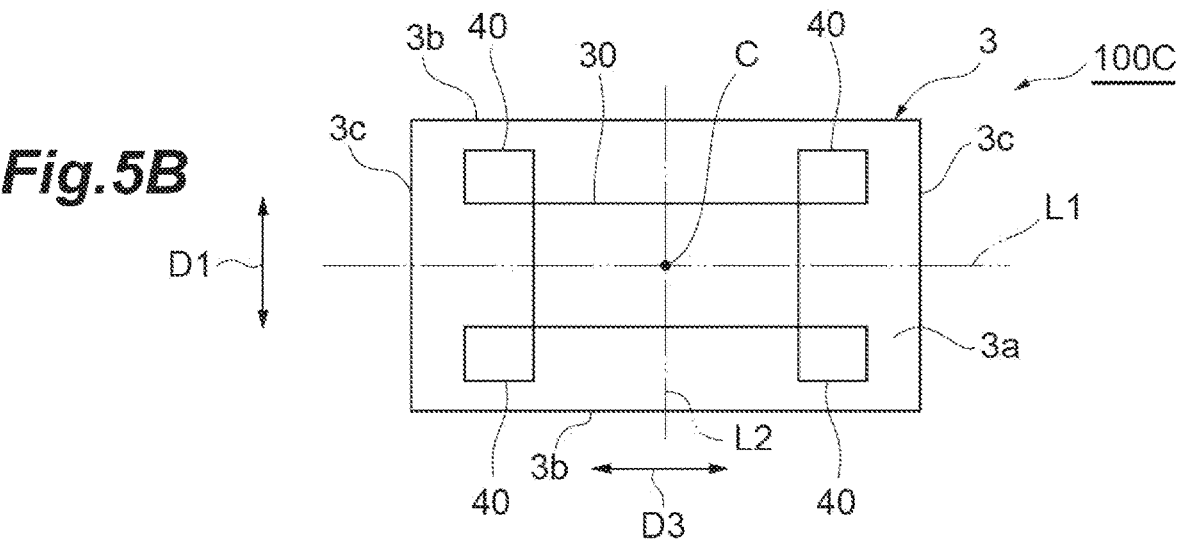
FIG. 5B is a side view of the electronic component device according to the third embodiment.
Figure 5C:
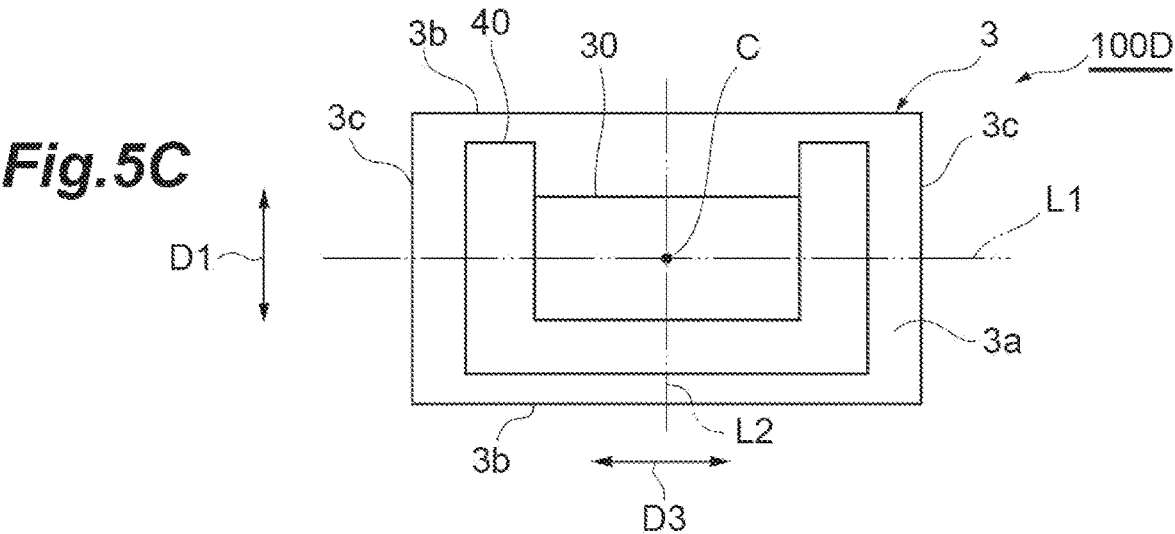
FIG. 5C is a side view of the electronic component device according to the third embodiment.

FIG. 5A is a side view of an electronic component device according to a third embodiment. FIG. 5B is a side view of an electronic component device according to a fourth embodiment. FIG. 5C is a side view of an electronic component device according to a fifth embodiment. In FIGS. 5A, 5B, and 5C, a metal terminal 20 is not shown. An electronic component device 100B according to the third embodiment shown in FIG. 5A, an electronic component device 100C according to the fourth embodiment shown in FIG. 5B, and an electronic component device 100D according to the fifth embodiment shown in FIG. 5C are different from the electronic component device 100 in that the disposition of an expansion member 40 is different and are the same as the electronic component device 100 according to the first embodiment in other respects.

In the electronic component device 100B, two expansion members 40 are disposed at two positions in both end portions of a bonding member 30 in the third direction D3, and no expansion member 40 is not disposed in both end portions of the bonding member 30 in the first direction D1 when viewed from the opposing direction. In the electronic component device 100C, four expansion members 40 are disposed at four positions that are adjacent to the respective four corners of the rectangular bonding member 30 and separated from each other when viewed from the opposing direction. In the electronic component device 100D, one expansion member 40 having a U shape when viewed from the opposing direction is disposed at three positions in both end portions of the bonding member 30 in the third direction D3 and in one end portion in the first direction D1.

In each of the electronic component device 100B, 100C, and 100D, the opposing face 21a is a flat face similarly to the electronic component device 100 and more easily receives the force from the expansion member 40 as compared with the case of being bent or curved. Accordingly, it is possible to further prevent overcurrent. In addition, in each of the electronic component devices 100B, 100C, and 100D, the expansion member 40 is also disposed around the bonding member 30. Accordingly, it is possible to much further prevent overcurrent. Note that, in each of the electronic component devices 100B and 100C, the expansion members 40 are disposed line-symmetrically with respect to both straight lines L1 and L2 passing through the center C of the bonding member 30 when viewed from the opposing direction and are also disposed point-symmetrically with respect to the center C of the bonding member 30. In the electronic component device 100D, the expansion member 40 is disposed line-symmetrically with respect to the straight line L1 passing through the center C of the bonding member 30 when viewed from the opposing direction.

The embodiments of the present invention have been described above; the present invention is not necessarily limited to the above described embodiments, and can be variously changed without departing from the gist.

In the present embodiment, the multilayer condenser has been exemplified as the electronic component 1, but the electronic component 1 is not limited to the multilayer condenser. The electronic component 1 is, for example, a multilayer electronic component, such as a multilayer inductor, a multilayer varistor, a multilayer piezoelectric actuator, a multilayer thermistor, or a multilayer composite component, or an electronic component other than the multilayer electronic component.

Although not shown, the disposition of the bonding member 30 and the expansion member 40 may be interchanged with each other in each of the electronic component devices 100B, 100C, and 100D.

In each of the electronic component devices 100, 100A, 100B, 100C, and 100D, the edge portions of the bonding member 30 and the expansion member 40 may overlap each other when viewed from the opposing direction. For example, in the electronic component device 100, the inner edge portion of the expansion member 40 may be positioned between the outer edge portion of the bonding member 30 and the opposing face 21a or between the outer edge portion of the bonding member 30 and the external electrode 3. Alternatively, for example, in the electronic component device 100, the outer edge portion of the bonding member 30 may be positioned between the inner edge portion of the expansion member 40 and the opposing face 21a or between the inner edge portion of the expansion member 40 and the external electrode 3.

What is claimed is:
1. An electronic component device comprising:
 an electronic component including an element body having a pair of end faces opposed to each other and a pair of external electrodes disposed on the pair of end faces;
 a pair of metal terminals electrically connected to the pair of external electrodes;
 a bonding member bonding and electrically connecting one of the pair of external electrodes to one of the pair of metal terminals; and
 an expansion member having thermal expansibility, the expansion member being configured to irreversibly increase in volume by a factor of at least 1.2 in response to the expansion member reaching a predetermined temperature, wherein the one of the pair of metal terminals includes an opposing face opposed to one of the pair of end faces in an opposing direction of the pair of end faces and bonded to the one of the pair of external electrodes by the bonding member, the expansion member is disposed between the opposing face and the one of the pair of external electrodes, and the opposing face is a flat face.

2. The electronic component device according to claim 1, wherein
the expansion member is, when viewed from the opposing direction, disposed around the bonding member.

3. The electronic component device according to claim 1, wherein
the expansion member is, when viewed from the opposing direction, disposed line-symmetrically with respect to a straight line passing through a center of the bonding member.

4. The electronic component device according to claim 1, wherein
the expansion member is, when viewed from the opposing direction, disposed point-symmetrically with respect to a center of the bonding member.

5. The electronic component device according to claim 1, wherein
the bonding member is, when viewed from the opposing direction, disposed around the expansion member.

6. The electronic component device according to claim 5, wherein
the bonding member is, when viewed from the opposing direction, disposed line-symmetrically with respect to a straight line passing through a center of the expansion member.

7. The electronic component device according to claim 5, wherein
the bonding member is, when viewed from the opposing direction, disposed point-symmetrically with respect to a center of the expansion member.

8. The electronic component device according to claim 1, wherein
the expansion member is configured to increase in volume by a factor of at least 10 in response to the expansion member reaching the predetermined temperature.

9. The electronic component device according to claim 1, wherein the predetermined temperature at which the expansion member increases in volume is set higher than (i) a melting point of solder in the bonding member or (ii) a curing temperature of resin in the bonding member.

10. The electronic component device according to claim 1, wherein the opposing face includes a first region bonded to the one of the pair of external electrodes by the bonding member and a second region on which the expansion member is disposed.

11. The electronic component device according to claim 1, wherein the expansion member is constituted by a resin material.

12. The electronic component device according to claim 11, wherein the resin material is epoxy resin or butyl rubber.

13. An electronic component device comprising:
an electronic component including an element body having a pair of end faces opposed to each other and a pair of external electrodes disposed on the pair of end faces;
a pair of metal terminals electrically connected to the pair of external electrodes;
a bonding member bonding and electrically connecting one of the pair of external electrodes to one of the pair of metal terminals; and
an expansion member having thermal expansibility, the expansion member being configured to increase in volume by a factor of at least 1.2 in response to the expansion member reaching a predetermined temperature, wherein
the one of the pair of metal terminals includes an opposing face opposed to one of the pair of end faces in an opposing direction of the pair of end faces and bonded to the one of the pair of external electrodes by the bonding member,
the expansion member is disposed between the opposing face and the one of the pair of external electrodes,
the opposing face is a flat face, and
the expansion member has an annular shape and surrounds the bonding member when viewed from the opposing direction.

14. An electronic component device comprising:
an electronic component including an element body having a pair of end faces opposed to each other and a pair of external electrodes disposed on the pair of end faces;
a pair of metal terminals electrically connected to the pair of external electrodes;
a bonding member bonding and electrically connecting one of the pair of external electrodes to one of the pair of metal terminals; and
an expansion member having thermal expansibility, the expansion member being configured to increase in volume by a factor of at least 1.2 in response to the expansion member reaching a predetermined temperature, wherein
the one of the pair of metal terminals includes an opposing face opposed to one of the pair of end faces in an opposing direction of the pair of end faces and bonded to the one of the pair of external electrodes by the bonding member,
the expansion member is disposed between the opposing face and the one of the pair of external electrodes,
the opposing face is a flat face, and
the bonding member has an annular shape and surrounds the expansion member when viewed from the opposing direction.

15. An electronic component device comprising:
an electronic component including an element body having a pair of end faces opposed to each other and a pair of external electrodes disposed on the pair of end faces;
a pair of metal terminals electrically connected to the pair of external electrodes;
a bonding member bonding and electrically connecting one of the pair of external electrodes to one of the pair of metal terminals; and
an expansion member having thermal expansibility, the expansion member being configured to increase in volume by a factor of at least 1.2 in response to the expansion member reaching a predetermined temperature, wherein
the one of the pair of metal terminals includes an opposing face opposed to one of the pair of end faces in an opposing direction of the pair of end faces and bonded to the one of the pair of external electrodes by the bonding member,
the expansion member is disposed between the opposing face and the one of the pair of external electrodes,
the opposing face is a flat face, and the expansion member irreversibly thermally expands and has electrical insulation at least in a thermally expanding state.

* * * * *